United States Patent [19]
Nakagawa et al.

[11] Patent Number: 5,574,273
[45] Date of Patent: Nov. 12, 1996

[54] NON-CONTACT SYSTEM PARALLEL DATA TRANSFER SYSTEM

[75] Inventors: Kazunari Nakagawa, Toride; Takeshi Tottori, Ibaraki-ken; Wasao Takasugi, Higashiyamato; Yoshiharu Hino, Toride; Takeshi Uchida, Saitama-ken, all of Japan

[73] Assignee: Hitachi Maxell, Ltd., Osaka, Japan

[21] Appl. No.: 257,906

[22] Filed: Jun. 13, 1994

[30]     Foreign Application Priority Data

Jun. 14, 1993 [JP] Japan ................................. 5-142210
Sep. 21, 1993 [JP] Japan ................................. 5-257690
Oct. 1, 1993  [JP] Japan ................................. 5-247020

[51] Int. Cl.⁶ ........................... G06K 19/06; G06K 07/06
[52] U.S. Cl. ................................ 235/492; 235/441
[58] Field of Search ................................ 235/375, 380, 235/449, 487, 492, 493, 441

[56]             References Cited

U.S. PATENT DOCUMENTS

| 4,791,285 | 12/1988 | Ohki | 235/492 X |
| 4,960,983 | 10/1990 | Inoue | 235/493 X |
| 5,198,647 | 3/1993 | Mizuta | 235/493 X |

FOREIGN PATENT DOCUMENTS

| 0453314 | 10/1991 | European Pat. Off. | 235/493 |
| 0261489 | 10/1988 | Japan | 235/375 |
| 3-232207 | 10/1991 | Japan | 235/487 |
| 5324946 | 12/1993 | Japan | 235/375 |

Primary Examiner—Donald T. Hajec
Assistant Examiner—Thien Minh Le

[57]            ABSTRACT

An electromagnetic coupling connector for transferring data by an electromagnetic coupling system, including a plurality of data transfer coils for transferring data, disposed at an end portion of a side surface of the connector, a waveform shaper for shaping a waveform of a data signal received by the data transfer coils, and a connector for transferring the signal obtained by the waveform shaper to an equipment to which the electromagnetic coupling connector is fitted. The electromagnetic coupling connector may include a signal transmission/reception portion and a power transmission or reception portion, the signal transmission/reception portion includes a signal amplification circuit, a waveform shaping circuit, a serial/parallel signal conversion circuit and a parallel/serial signal conversion circuit, the power transmission portion includes an oscillation circuit, and the power reception portion includes a rectification/smoothing circuit and a constant voltage.

31 Claims, 14 Drawing Sheets

FIG. 20
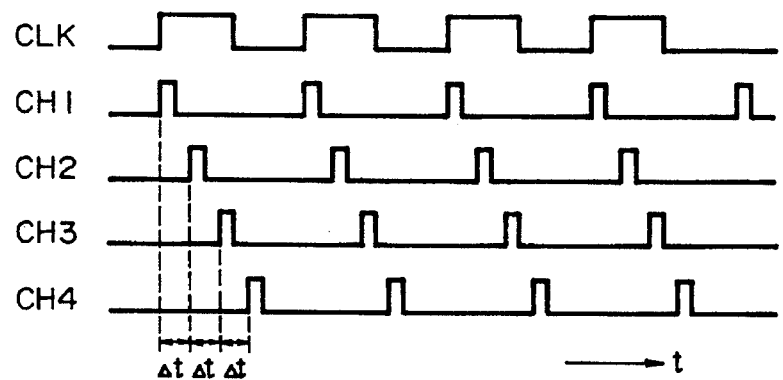
FIG. 21
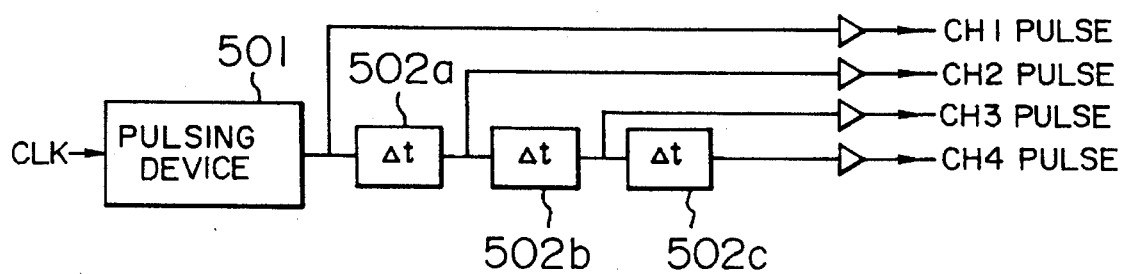
FIG. 22
```
CH1 :   1    0    0    0
CH2 :   0    1    0    0
CH3 :   0    0    1    0
CH4 :   0    0    0    1
DATA   00,  01,  10,  11
```

5,574,273

NON-CONTACT SYSTEM PARALLEL DATA TRANSFER SYSTEM

BACKGROUND OF THE INVENTION

1. Field of the Invention

This invention relates to a non-contact type IC card capable of transferring data at a high rate and having excellent ambient resistance and plug-in/out resistance, an electromagnetic coupling connector used for the IC card, and an IC card system. More particularly, the present invention relates to an electromagnetic coupling system between an IC card and a terminal equipment.

2. Description of the Related Art

A memory card as one of the kinds of IC cards has been used recently as a data base of electronic notebooks, an external storage medium of various personal computers, an add-on memory, and so forth, and the demand for the memory card as well as its application field have been drastically expanded.

Coupling systems between this memory card and a terminal equipment can be broadly classified into a pin plug-in system and a non-contact system. The pin plug-in system uses about 68 pins, for example, and can exchange signals. Therefore, it can transfer 8-bit or 16-bit parallel data and can make high speed read and write data. However, because a surface of a connector (conductor) is exposed, this system involves the drawbacks that contact defect is likely to occur due to contamination by dust and oils, and plug-in/out resistance drops with miniaturization of the pins.

The latter system, that is, the non-contact system, is free from the problems of the former because the conductor is not exposed, and this system can be employed even under a contaminated environment. Therefore, it has been put into practical application in various fields.

An electromagnetic coupling system and a system utilizing light or radiowaves have been proposed as means for supplying power and exchanging signals under a non-contact state. Among them, the electromagnetic coupling system has been put into practical application at present from the aspect of the cost and power consumption.

FIG. 1 is a plan view showing a mounting state of electronic components in a memory card using the electromagnetic coupling system according to the prior art. The drawing shows an SRAM card, by way of example, using the electromagnetic coupling system which is generally referred to as a "sheet coil system". A large sheet coil 101, a plurality of small sheet coils 102a, 102b, 102c, memory ICs 103a, 103b for storing and holding data such as SRAMs, a control IC 104 for controlling data read/write, a cell 105 for holding data recorded in the memory ICs 103a, 103b, etc., are mounted to a printed board 100.

The large sheet coil 101 is a coil for receiving power to the IC card and clock signals, and has a large number of turns and a large diameter so as to receive sufficient power. The small sheet coils 102a to 102c function as a data reception coil 102a, a data transmission coil 102b and a command signal reception coil 102c, for example. These sheet coils 101 and 102 are formed by the same method as the method of forming a conductor pattern which is formed on the printed board 100.

Though not shown in the drawing, the coil of the terminal equipment is disposed at a position at which it opposes the coil of the IC card so that when the line of magnetic force generated by the coil on the terminal equipment side, for example, crosses the coil on the IC card side, an induced current develops on the coil on the IC card side on the basis of the Lenz's law and signal exchange can be thus made.

In the construction described above, data exchange is fully executed by serial signals. Therefore, this system is more disadvantageous in the transfer rate than the contact system which is based on the parallel transfer of 8-bits or 16-bits.

Incidentally, parallel transfer can be attained by increasing the number of coils. However, because the occupying area is generally about 100 mm$^2$ for the small sheet coils and about 400 mm$^2$ for the large sheet coil, the sheet coils can be increased only at the sacrifice of the mounting areas of other electronic components, and a greater memory capacity is impeded.

FIG. 2 is a plan view showing the mounting state of electronic components, and mitigates the problems with the prior art example shown in FIG. 1. (Refer, for example, to JP-A-3-232207.) In the drawing, reference numerals 106a to 106i denote thin film coils, and reference numeral 107 denotes a thin film coil module containing these thin film coils 106a to 106i.

This construction is directed to 8-bit parallel transfer and uses a thin film coil module 107 including nine thin film coils 106, that is, eight thin film coils 106a to 106h for data transmission/reception and one thin film coil 106i for receiving a command signal.

As described above, miniaturization can be attained by using a plurality of thin film coils 106a to 106i, and 8-bit parallel transfer can be executed without much increasing the occupying area of the coils.

According to these prior art devices described above, however, the coils for effecting data exchange and supply of power by electromagnetic coupling are formed on, or mounted to, the same substrate with other electronic components such as a memory IC, a control IC, etc. After all, the number of electronic components mounted or their mounting form imposes limitation, and this construction is not suitable for accomplishing higher functions and greater capacity of the IC card.

As described above, the IC card of the electromagnetic coupling system and the pin plug-in system IC card have both merits and demerits. Therefore, they have been developed and designed in accordance with the object of their use or application. In other words, unnecessary time has been spent for the development and design, the printed wiring board cannot be used in common, and the production cost increases eventually.

The prior art technology described above has been designed on the premise that mutual interference does not exist between parallel transmission lines. If the parallel transmission lines are close to one another with small gaps when signal transfer is effected by a magnetic flux or light, for example, magnetic or optical interference occurs between the transmission lines and correct signal transmission cannot be made. In other words, according to the prior art technology, the transmission lines are spationally spaced apart from one another to such an extent that mutual interference between them can be substantially neglected. Accordingly, a higher density cannot be accomplished by bringing the transmission lines closer to one another beyond this limit.

SUMMARY OF THE INVENTION

It is a first object of the present invention to provide an IC card capable of solving the problems with the prior art described above and capable of attaining higher functions and a greater capacity, an electromagnetic coupling connector using such an IC card, and an IC card system.

It is a second object of the present invention to provide an electromagnetic coupling connector which can replace connectors of other types such as a pin plug-in connector.

It is a third object of the present invention to provide a data transfer system which does not generate interference with adjacent transmission lines in a plurality of parallelized signal transmission lines, and can effect high density data transfer.

To accomplish the objects described above, a data transfer system according to the present invention includes a portable data recording medium and an equipment main body for effecting data transfer by an electromagnetic coupling system by fitting the portable data recording medium thereto, and has a construction wherein a plurality of data transfer coils are juxtaposed at an end portion of a side face of the portable data recording medium, a plurality of data transfer coils are juxtaposed at positions of the equipment main body corresponding to the data transfer coils of the portable data recording medium, and parallel data transfer is effected between the portable data recording medium and the equipment main body.

The present invention provides a portable data recording medium for effecting data transfer with an external equipment by an electromagnetic coupling system, which medium includes a plurality of data transfer coils juxtaposed at an end portion of a side face of the portable data recording medium so as to effect parallel data transfer with the external equipment.

The present invention provides also an electromagnetic coupling connector for effecting data transfer by an electromagnetic coupling system, which includes at least a plurality of data transfer coils disposed at an end portion of a side face of the connector for transferring data, waveform shaping means for shaping the waveform of a data signal received by the data transfer coils, and connection means for transferring the signals obtained by the waveform shaping means to an equipment to which the electromagnetic coupling connector is fitted.

According to the constructions described above, limitations on the number of electronic components mounted and on the mounting force become smaller, though the parallel data transfer system is employed and consequently, higher functions and a greater capacity of an IC card can be accomplished.

To accomplish the objects described above, the present invention provides an electromagnetic coupling connector for effecting data transfer by an electromagnetic coupling system, which includes at least a plurality of data transfer coils for transferring data, disposed at an end portion of a side face of the connector, waveform shaping means for shaping the waveform of a data signal received by the data transfer coils, and connection means for transferring the signal obtained by the waveform shaping means to an equipment to which the electromagnetic coupling connector is fitted, and wherein the shape and outer dimension of the electromagnetic coupling connector are the same as the shape and an outer dimension of a pin plug-in type connector. Accordingly, since the waveform shaping circuit for shaping a pulse waveform inherent to electromagnetic conversion to a square pulse is incorporated in a signal reception portion, the electromagnetic coupling connector can be fitted to a reception main body such as an IC card as a substitution for the pin plug-in type connector. Accordingly, the circuit of the reception main body side need not be changed, and a printed wiring board and other components can be used in common.

To accomplish the objects described above, the present invention employs the construction wherein a plurality of data transfer coils of the portable data recording medium and those of the equipment main body are constituted in such a manner that directions of magnetic fluxes crossing adjacent data transfer coils are not parallel to one another. Such a construction can prevent adverse influences of cross-talk due to leakage fluxes.

In the data transfer system according to the present invention, each of the portable data recording medium and the equipment main body includes at least three data transfer coils aligned in such a manner that a central axis of each coil is mutually parallel or coaxial, and directions of magnetic fluxes occurring when a current is caused to flow through the coils of either the portable data recording medium or the equipment main body as the data transmission side change by 180° in every two coils. According to this construction, the magnetic fluxes at both ends have mutually opposite directions and offset each other even when a signal pattern "1, 0, 1", which causes the most critical cross-talk problem, may be inputted to any set of coils, and the adverse influences of cross-talk can be thus prevented.

The present invent ion can prevent the occurrence of an error due to cross-talk by the method of controlling the directions of the magnetic fluxes occurring in the coils constituting the electromagnetic coupling connector, without requiring any excessive components and production steps, and can reduce the gap between the coils to about the half of the prior art. Accordingly, the present invention can obtain an electromagnetic coupling connector having high productivity and high functionality.

According to the construction of the present invention, each of the portable data recording medium and the equipment main body has at least two data transfer coils aligned in such a manner that a central axis of each coil is mutually parallel or coaxial, and there is disposed a cross-talk compensation circuit for causing a predetermined current to flow through a predetermined coil of the portable data recording medium or the equipment main body as the data transmission side so as to generate a magnetic flux to such an extent as to offset the leakage magnetic fluxes occurring in the other coils. According to such a construction, a current which is judged as suitable by the cross-talk compensation circuit flows through the coil which is to generate a "0" signal in accordance with a signal pattern, and there occurs a magnetic flux which crosses the coils on the reception side and offsets the magnetic flux due to cross-talk. Accordingly, the influences of cross-talk can be substantially eliminated.

According to the construction of the present invention, the end portion of the side face of the portable data recording medium is shaped into a zigzag shape, the data transfer coils described above are disposed on the end face between the apexes and valleys of the zigzag shape, and the data transfer coils are disposed at those positions at which they oppose the data transfer coils of the portable data recording medium. In the data transfer system having such a construction, a large number of coils can be disposed on one of the end faces of the portable data recording medium, and when data signals are transmitted or received, they can be simultaneously transmitted or received in parallel with one another, and a high transfer rate can be obtained. Because the coils can be disposed in the zigzag form or can be disposed in such a manner that the magnetic fields generated between the adjacent coils orthogonally cross one another, the occurrence of cross-talk can be restricted. Further, positioning between the portable data recording medium and the equipment main body becomes easier, and data transfer becomes possible with high operability and high efficiency.

To accomplish the objects described above, in the data transfer system according to the present invention, the data transfer coils of the portable data recording medium or the equipment main body as the data transmission side are subjected to transmission control in such a manner as not to transmit signals when coils adjacent thereto transmit the signals and to transmit the signals when the adjacent coils do not transmit the signals. As a result, magnetical or optical interference does not occur with adjacent transmission lines in a plurality of parallelized signal transmission lines, and high density data transfer becomes possible.

BRIEF DESCRIPTION OF THE DRAWINGS

FIG. 20 is a timing chart showing the tenth embodiment of the present invention;

FIG. 21 is a block diagram showing a concrete construction of the tenth embodiment of the present invention;

FIG. 22 is a matrix diagram showing the eleventh embodiment of the present invention;

DESCRIPTION OF THE PREFERRED EMBODIMENTS

Figure 3:
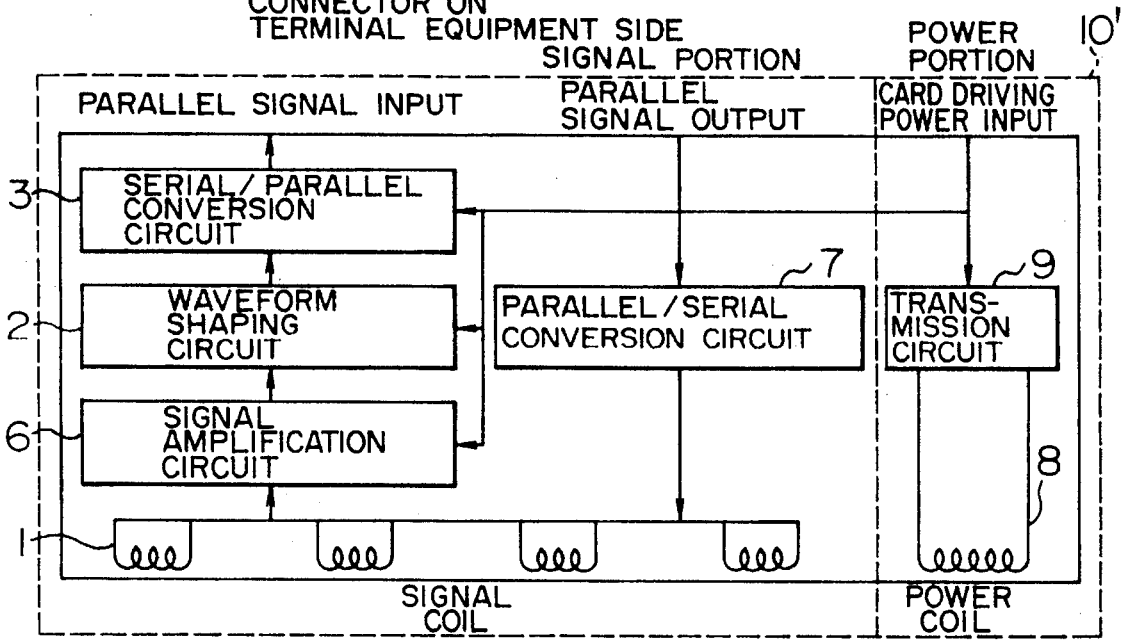
FIG. 3 is a block diagram showing a basic construction of an electromagnetic coupling connector according to an embodiment of the present invention.
Figure 3:
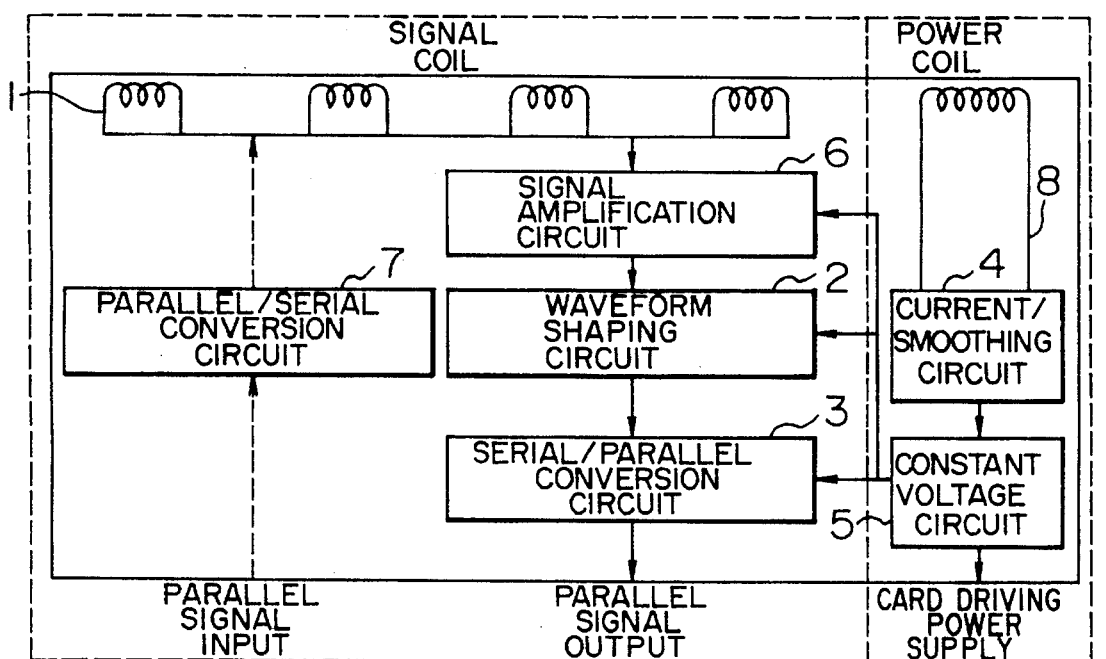

The first embodiment of the present invention will be described with reference to FIGS. 3 to 8. FIG. 3 is a block diagram showing the basic construction of an electromagnetic coupling connector according to the first embodiment of the present invention. The basic construction of the present invention will be hereby explained about transmission and reception of 4-bit parallel data, by way of example.

This embodiment is directed to exchange signals and power by combining an electromagnetic coupling connector 10' on a terminal equipment side with an electromagnetic coupling connector 10 on an IC card side. A signal amplification circuit 6 for amplifying a weak voltage (current) occurring in a signal coil 1, a waveform shaping circuit 2 for shaping a pulse waveform inherent to electromagnetic conversion to a square pulse waveform and a serial/parallel conversion circuit 3 for converting 4-bit parallel data to 8-bit parallel data, for example, are assembled in a signal portion of the electromagnetic coupling connector. An address signal, a data signal and a command signal are simultaneously outputted as parallel signals from the rear end of the electromagnetic coupling connector.

An oscillation circuit 9 built in a power portion of the electromagnetic coupling connector 10' on the terminal equipment side oscillates a predetermined frequency, and A.C. power is converted to a D.C. constant power supply by a shaping/smoothening circuit 4 and a constant voltage circuit 5 that are built in the electromagnetic coupling connector on the IC card side. Since the electromagnetic coupling connector can be fitted to the IC card as a substitute for a pin plug-in type connector, the circuit of the IC card need not be changed.

Incidentally, the signal amplification circuit 6 and the serial/parallel conversion circuit 3 can be omitted when a sufficient signal output can be secured and when the signal coils can be disposed in the number corresponding to the number of all the bits, respectively. In the case of transmission, a parallel/serial conversion circuit 7 for dividing twice the 8-bit signal into the 4-bit signals is necessary, contrary to the case of reception. Reference numeral 8 denotes a power coil, which is disposed at the end portion of the electromagnetic coupling connector 23 in alignment with the signal coil 1.

Figure 4:
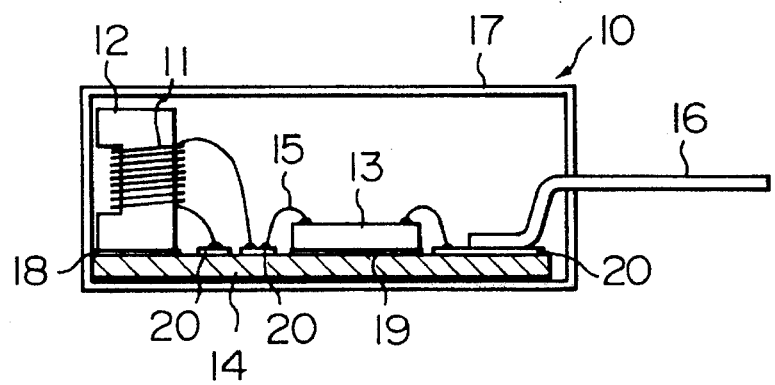
FIG. 4 is a sectional view showing an example of the concrete construction of the electromagnetic coupling connector of the invention shown in FIG. 3.

FIG. 4 is a sectional view showing an example of the definite structure of the electromagnetic coupling connector according to the present invention shown in FIG. 3.

Reference numeral 11 in the drawing denotes a coil comprising a copper wire, 12 is a magnetic core made of Mn-Zn ferrite, for example, 13 is a semiconductor device incorporating integrally the signal amplification circuit 1, the waveform shaping circuit 2, the serial/parallel conversion circuit 3, the parallel/serial conversion circuit 7, into one chip, 14 is a mounting substrate made of glass-epoxy, for example, 15 is a lead wire made of a gold wire, for example, 16 is an outer lead made of a copper plate, for example, 17 is a casing made of a synthetic resin, for example, 18 is an adhesive made of an epoxy resin, for example 19 is a die-bond agent made of silver paste, and 20 is an electrode pattern made of a copper foil, for example.

Figure 1:
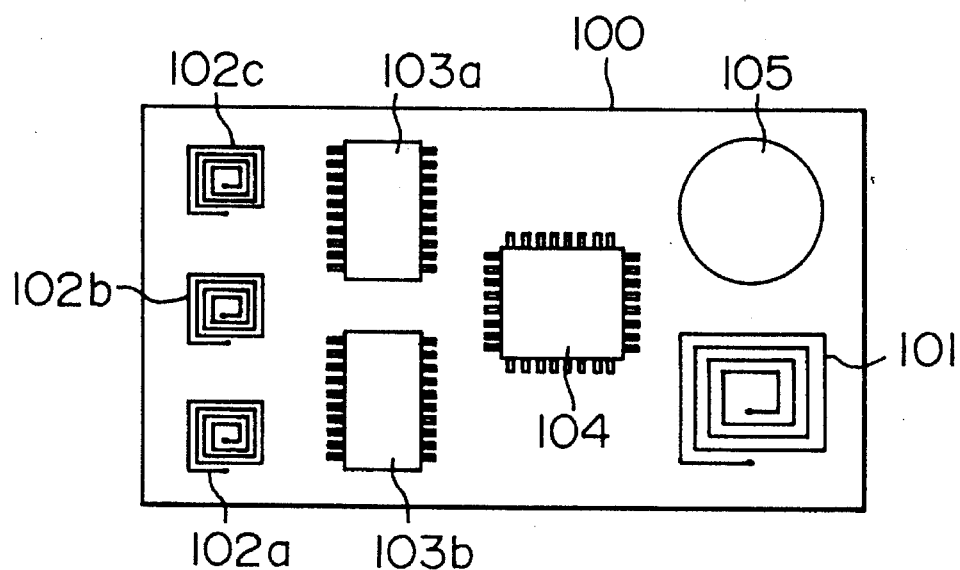
FIG. 1 is a plan view of an IC card according to the prior art.
Figure 2:
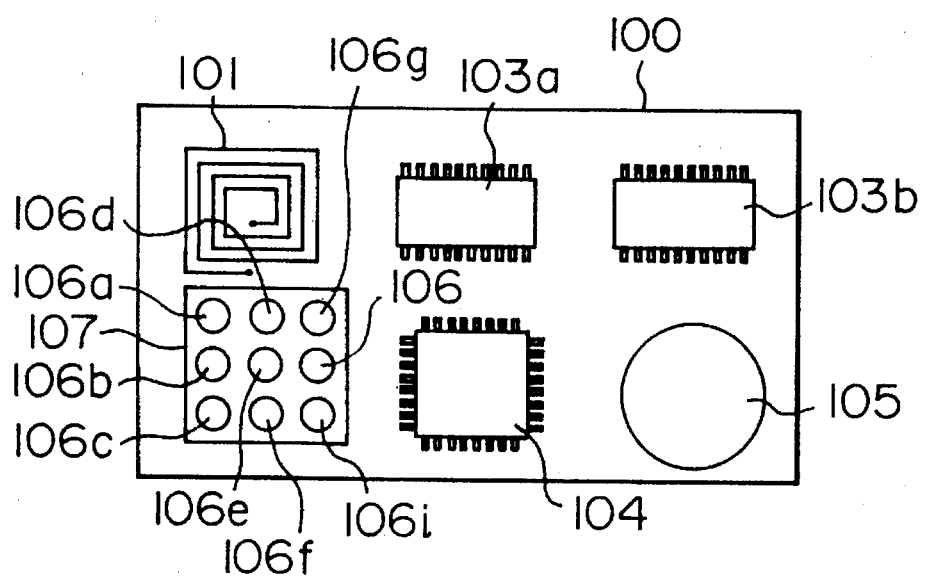
FIG. 2 is also a plan view of an IC card according to the prior art.

The magnetic core 12 on which the coil 11 is wound is fixed by the adhesive 18 to the mounting substrate 14, and the end of the coil 11 is electrically connected to the electrode pattern 20 by soldering, for example. The semiconductor device 13 is formed by integrating each circuit explained with reference to FIG. 1, is fitted to the mounting substrate 14 by the die bond agent 19, and is wire-bonded to the electrode pattern 20 by the lead wire 15 by using a COB technology. The outer lead 16 is for the electrical connection with a card substrate (not shown), and is soldered to the electrode pattern 20. Incidentally, a synthesic resin may be molded in place of the casing 17.

Figure 5:
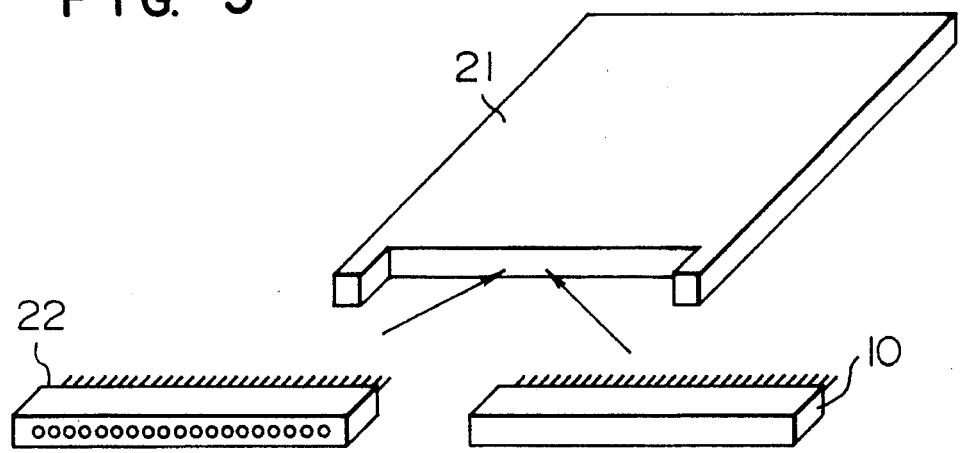
FIG. 5 is a perspective view showing an example of fitting of the electromagnetic coupling connector of the invention and a pin plug-in type connector into an IC card.

The electromagnetic coupling connector 10 having the structure described above can be constituted into the same outer shape and the same dimension as those of the pin plug-in type connector 22 as shown in FIG. 5. For this reason, the constituent components of the IC card 21 according to the prior art can as such be used, and a contact type (pin plug-in type connector 22 is fitted) or non-contact type (electromagnetic coupling connector 10 is fitted) IC card can be constituted by merely changing the connector.

Figure 6:
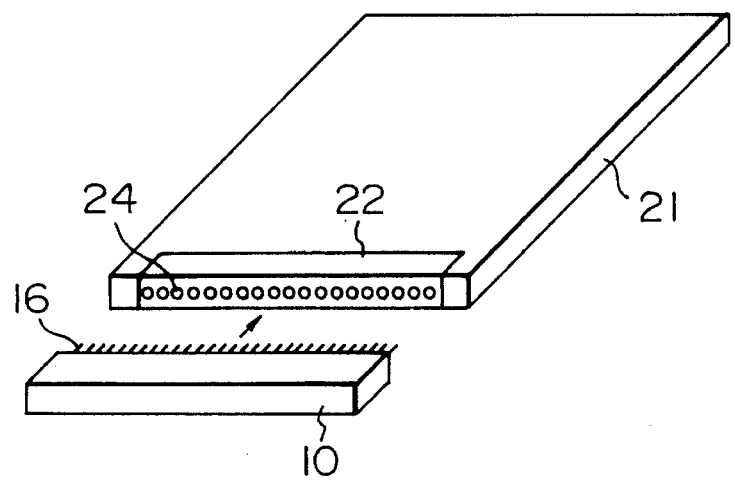
FIG. 6 is a perspective view showing an example of fitting of the electromagnetic coupling connector of the invention to a contact type IC card.

If the pin insertion holes 24 of the pin plug-in type connector 22 are aligned with the positions of the outer leads 16 as shown in FIG. 6, the pin plug-in type IC card 21 can be changed to the non-contact type IC card by inserting the electromagnetic coupling connector 10.

FIGS. 7A to 8B are perspective views showing an example of the production process of the embodiment shown in FIG. 4, and the production process will be explained sequentially with reference to these drawings.

Figure 7A:
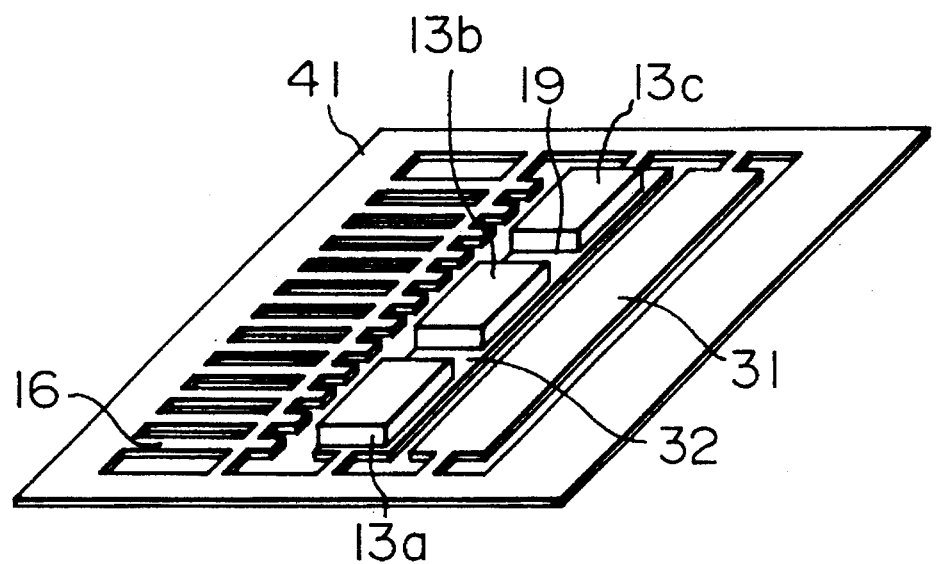
FIGS. 7A and 7B are perspective views showing an example of a production process of the connector shown in FIG. 4.

FIG. 7A: The die bond agent 19 is applied in a suitable amount to a semiconductor device support member 32 of the lead frame 41 comprising the assembly of the outer leads 16, the semiconductor device support member 32 and the core support member 31, and the semiconductor devices 13a, 13b, 13c are then arranged and fixed to predetermined positions.

Figure 7B:
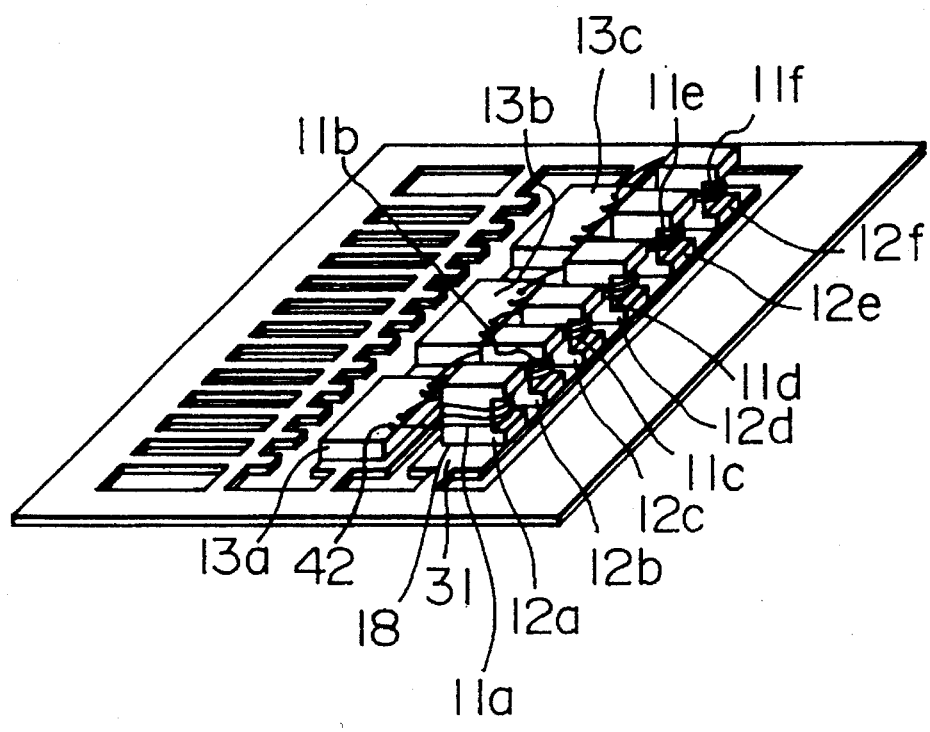

FIG. 7B: The magnetic cores 12a, 12b, 12c, 12d, 12e, 12f, each having the coil 11a to 11f wound thereon, are fixed to predetermined positions of the core support member 31 by the adhesive 18. The end portions of each coil 11a to 11f are wire-bonded to the bonding pad 42 of the corresponding semiconductor device 13a to 13c.

Figure 8A:
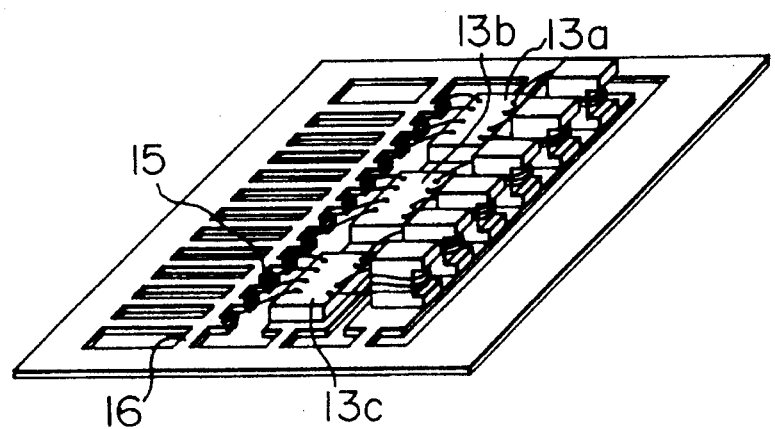
FIGS. 8A and 8B are also perspective views showing an example of a production process of the connector shown in FIG. 4.

FIG. 8A: The bonding pad 42 of the semiconductor device 13a to 13c and the distal end portions of the outer leads 16 are wire-bonded by the lead wires 15.

Figure 8B:
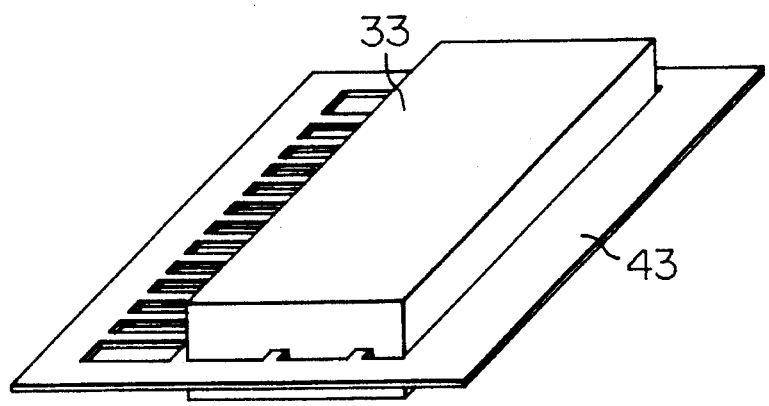

FIG. 8B: A molded article is obtained by molding a mold resin 33 by transfer molding. Finally, frame portions 43 of the lead frame 41 are cut by a press and if necessary, the outer leads 16 are shaped into a predetermined shape. In this way, the electromagnetic coupling connector can be obtained.

The electromagnetic coupling connector having the construction described above can be produced fully automatically, and is suitable for mass production. Since the connector is molded, it has excellent heat resistance, waterproofness, stress resistance, and so forth.

Figure 9:
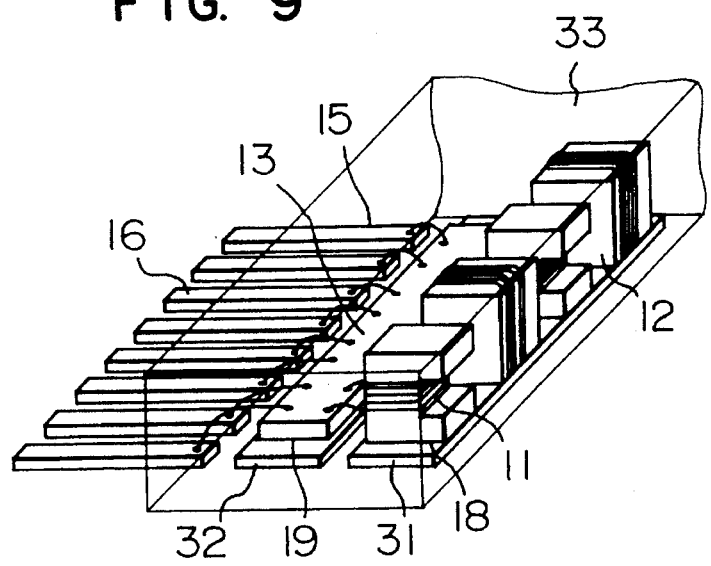
FIG. 9 is a perspective view showing an electromagnetic coupling connector according to the second embodiment of the present invention.

FIG. 9 is an explanatory view useful for explaining the second embodiment of the present invention. In the first embodiment, the magnetic cores 2 are fixed on the core support member in such a manner that all of them face in the same direction or in other words, the winding directions of the coils 12 are in the same direction. In this embodiment, however, the magnetic cores 2 are fixed through the adhesive layer 16 in such a manner that winding directions of adjacent coils 1 cross orthogonally one another. When the winding directions are alternately changed in this way, cross-talk can be reduced. In other words, this arrangement can prevent the leakage magnetic fluxes of the adjacent coils from entering the reception coil and can prevent a false signal from being received to cause a transfer error. Incidentally, the coils of the adjacent coils for data transmission are arranged in this embodiment so that the directions of the crossing magnetic fluxes are substantially straight, but the effect of reducing cross-talk can be obtained so long as the directions of the crossing magnetic fluxes generated by the data transmission coils are not parallel with one another.

Figure 10:
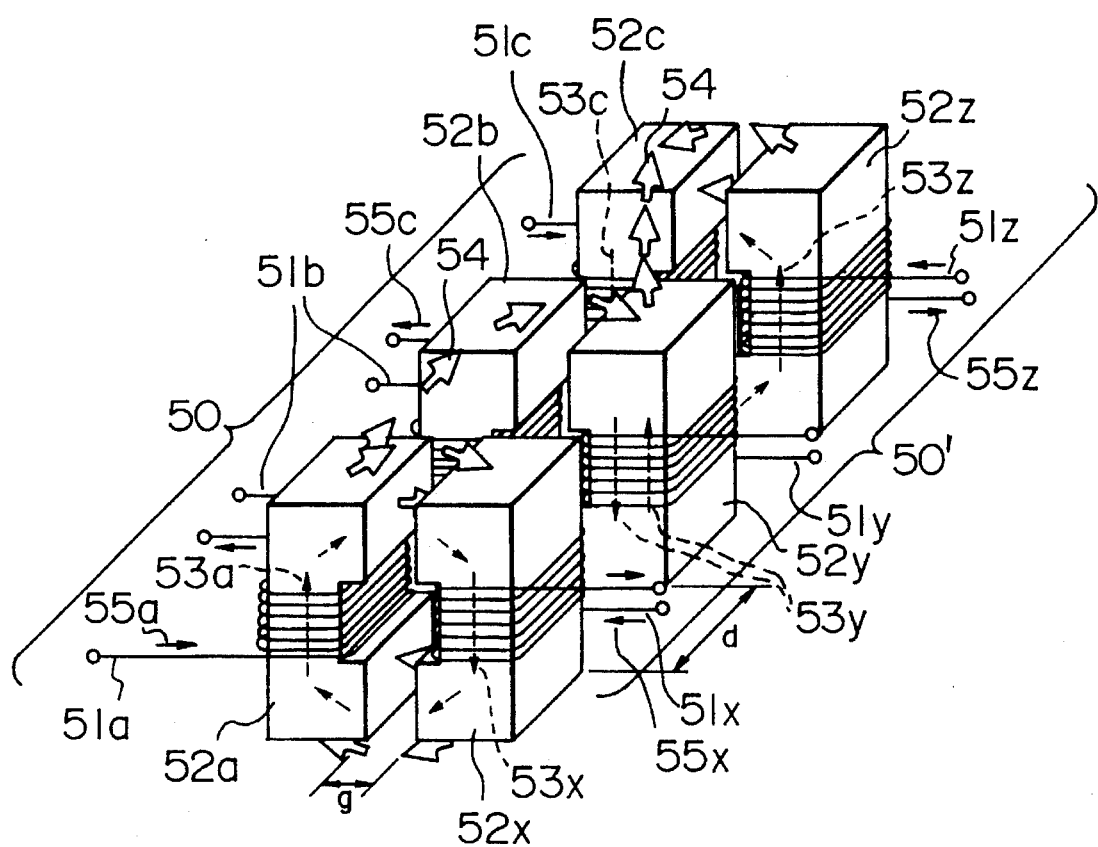
FIG. 10 is a perspective view showing the state of electromagnetic coupling established by using an electromagnetic coupling connector according to the third embodiment of the present invention.

FIG. 10 is a perspective view useful for explaining the third embodiment of the present invention and shows the condition of electromagnetic coupling established by using the electromagnetic coupling connector according to the present invention. To explain the basic construction of the present invention, three coils are shown aligned in the drawing, but (N+α) coils corresponding to the number of channels necessary for the exchange of N-bit parallel data, power, clock signals, command signals, etc., are aligned in practice. In FIG. 10, the electromagnetic coupling connector 50 on the transmission side has a structure wherein magnetic cores 52a, 52b, 52c each having the coil 51a, 51b, 51c wound thereon are aligned. A wire made of a material having a small electric resistance such as copper is used for the coil 51a, 51b, 51c, while a soft magnetic material having a high permeability such as Mn-Zn ferrite, Ni-Zn ferrite, permalloy, etc., is used for the magnetic core 52a, 52b, 52c in order to efficiently absorb a line of magnetic force. This electromagnetic coupling connector is so disposed as to oppose the electromagnetic coupling connector 50' on the reception side with a small distance between them, so as to establish electromagnetic coupling. Since the currents 55a, 55c flowing through the coils 51a, 51c have mutually opposite flowing directions, magnetic fluxes in 180° opposite directions are generated in the magnetic cores 52a, 52c. The magnetic fluxes in the opposite directions can be obtained, too, by reversing the winding directions of the coils.

When a signal pattern "1, 0, 1" is inputted in the construction described above, the leakage flux from the magnetic core 52a from above the magnetic core 52y while the same quantity of the leakage flux from the magnetic core 52c reaches it from below. Therefore, the magnetic fluxes generated by the cross-talk inside the magnetic core 52y offset each other and become substantially zero, so that no current flows through the coil 51y and the false signal is not outputted. The core gap at this time can be reduced theoretically to almost zero, but since offset does not occur when signal patterns such as "1, 0, 0", "0, 0, 1", etc., are inputted, a core gap to a certain extent is necessary. However, the influences of cross-talk can be eliminated with the coil gap which is the half when no counter-measure is employed. Accordingly, the packing density of the coil can be drastically improved, and higher speed as well as higher function of data transfer by multiple channels can be accomplished. Disposition of an electromagnetic shield material for cutting off the leakage flux and addition of a noise filter circuit, etc., for canceling the noise resulting from cross-talk, which have been necessary in the prior art, become unnecessary. Accordingly, the connector of this embodiment can be economically mass-produced.

Figure 11:
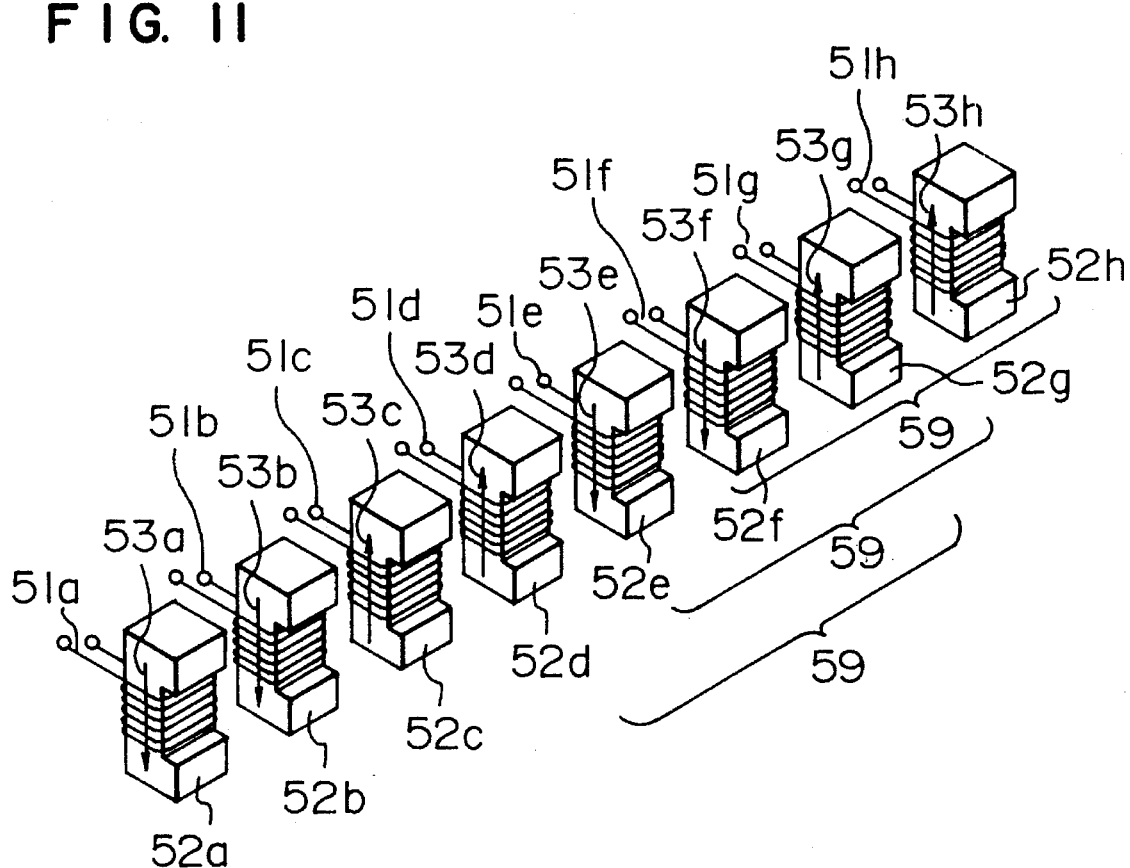
FIG. 11 is a perspective view showing a structural example of a coil which can establish electromagnetic coupling shown in FIG. 10.

FIG. 11 is a perspective view showing a structural example of the coils capable of establishing the electromagnetic coupling state shown in FIG. 10. As shown in the drawings, eight coils are arranged so that the directions of the magnetic fluxes 53a to 53h generated in these coils change by 180° in every two coils. The flux of each coil can be changed by 180° by changing the directions of the flowing currents or by changing the winding directions of the coils.

Accordingly, when the signal pattern "1, 0, 1" is applied to any sets of 59a, 59b, 59c, the fluxes at their ends become always opposite and adverse influences of cross-talk can be prevented.

Figure 12:
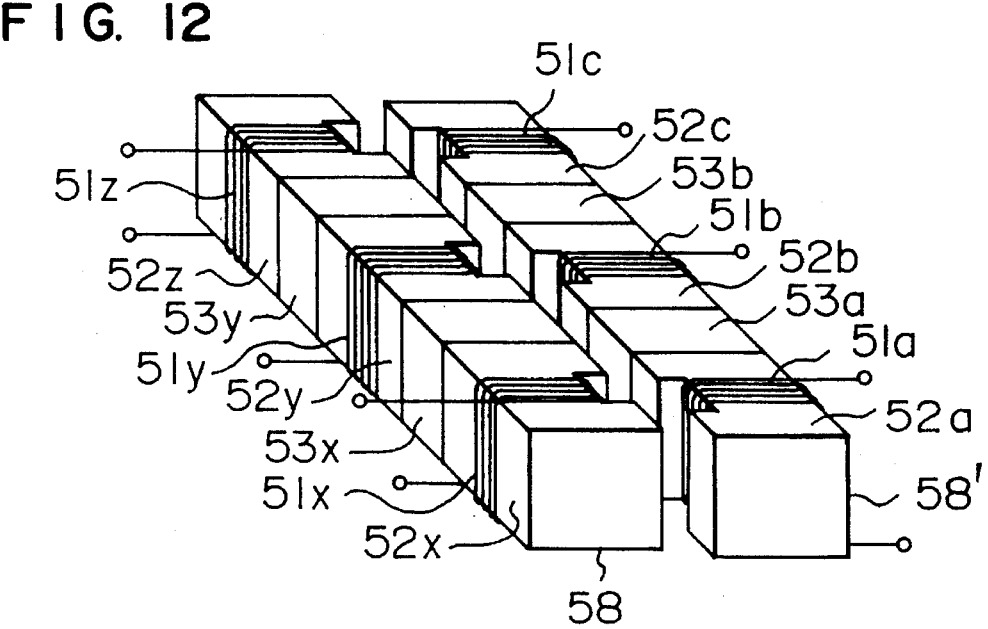
FIG. 12 is a perspective view showing the fourth embodiment of the present invention.

FIG. 12 is a perspective view showing the electromagnetic coupling connector according to the fourth embodiment of the present invention. In this embodiment, to cut off the lines of magnetic force, the magnetic cores 52a to 52c each having the coil 51a to 51c wound thereon are aligned through non-magnetic spacers 53a to 53c in such a manner that the direction of occurrence of the magnetic fluxes becomes uniaxial, and the electromagnetic coupling connector 58' on the IC card side having the integrated structure and the electromagnetic coupling connector 58 having a similar structure on the terminal equipment side are so arranged as to oppose each other and to establish electromagnetic coupling.

Non-magnetic ceramic materials such as barium titanate, calcium titanate, etc., and metallic materials having a small electric resistance and providing the effect of a magnetic shield by the generation of an eddy current, such as copper and aluminum, are used as the material of the spacers 53a; 53b; 53c so as to prevent cross-talk resulting from the leakage of the line of magnetic force to the adjacent magnetic cores 52 and coils 51.

In the construction described above, too, the directions of the currents or the winding directions of the coils are opposite in every two coils. Accordingly, the directions of the fluxes in every two coils change by 180°, and the coil gap not affected by cross-talk can be reduced to the half.

The foregoing embodiments have been explained on the transmission side. To correctly receive the signals on the reception side, the winding directions of the coils or wiring of the terminals of the coil must be reversed. Further, an inverter for inversing every other signals may also be used.

The third and fourth embodiments described above can prevent the occurrence of the error resulting from cross-talk by the method which controls the directions of the fluxes occurring in the coils constituting the electromagnetic coupling connector without requiring at all other additional members and production steps. Because these embodiments can reduce the coil gap to about a half of that of the prior art connector, they can obtain the electromagnetic coupling connector having high functions with high productivity.

Figure 13:
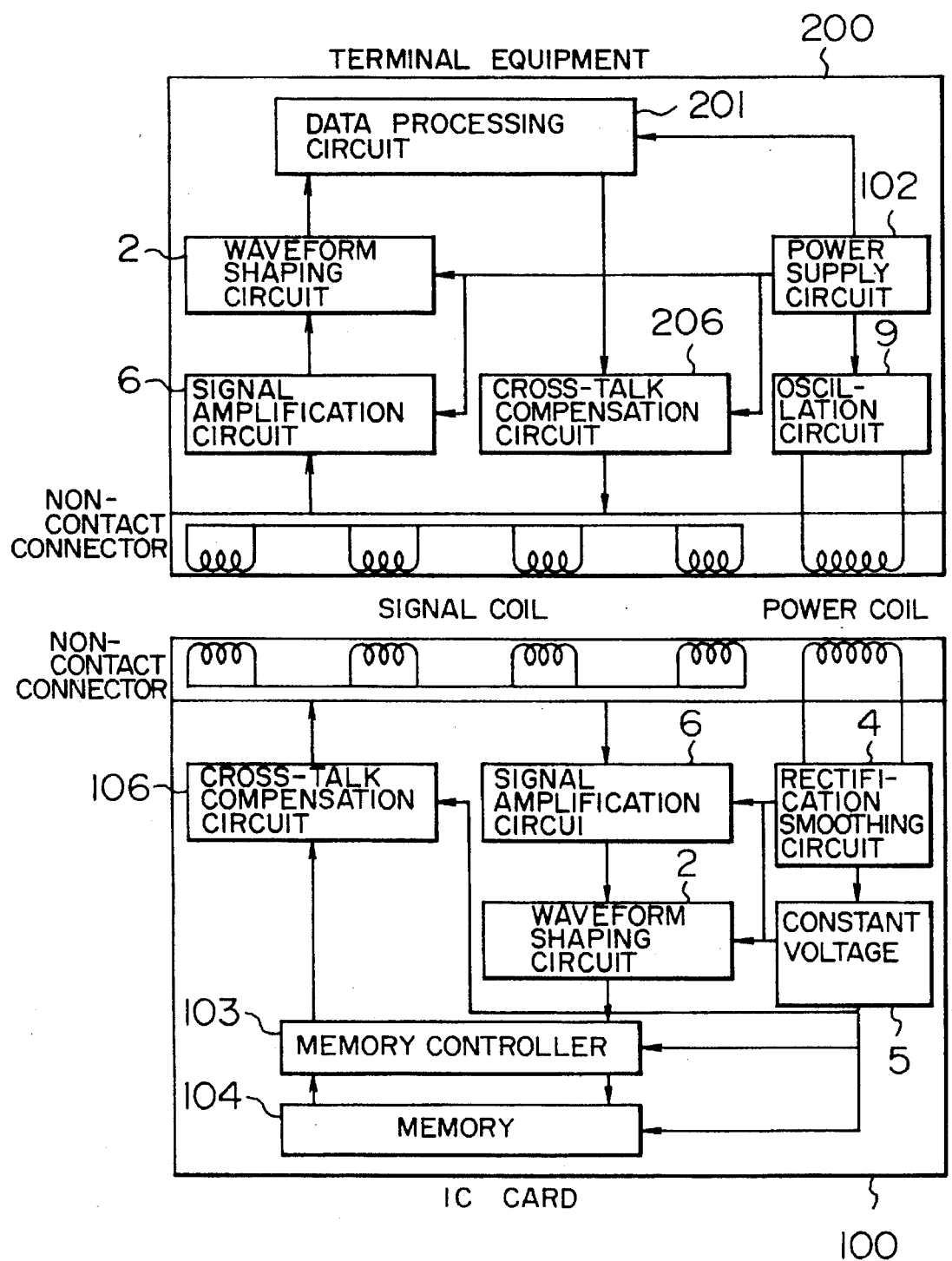
FIG. 13 is a block circuit diagram showing the fifth embodiment of the present invention.

FIG. 13 is a block diagram showing the electromagnetic coupling connector according to the fifth embodiment of the present invention. In the system according to this embodiment, a cross-talk compensation circuit 206 controlled by a data processing circuit is disposed on the terminal equipment side, and a cross-talk compensation circuit controlled by a memory controller 103 is disposed on the IC card 100.

This cross-talk compensation circuit 206 causes a suitable current to flow in an opposite direction through the coil which is to generate the "0" signal at the time of data transmission so as to generate a flux which offsets the fluxes that would be received from other coils. The quantity of the current that is caused to flow may be set in advance in accordance with the signal pattern, or may be judged, whenever necessary.

According to the construction described above, the current which is judged as suitable by the cross-talk compensation circuit flows through the coil which is to transmit the "0" signal in accordance with the signal pattern, and a magnetic flux which offsets the flux resulting from cross-talk and crosses the coils on the reception side occurs. Accordingly, the influences of cross-talk can be substantially eliminated. According to this construction, the effect of cancellation of cross-talk can be expected for all the signal patterns, and the coil gap can be therefore reduced further finely.

Although this embodiment has been explained about the IC card or the connector, the present invention is not limited to them, but can be applied to all the apparatuses and equipment which transfer signals such as data by multiple channels.

Figure 14:
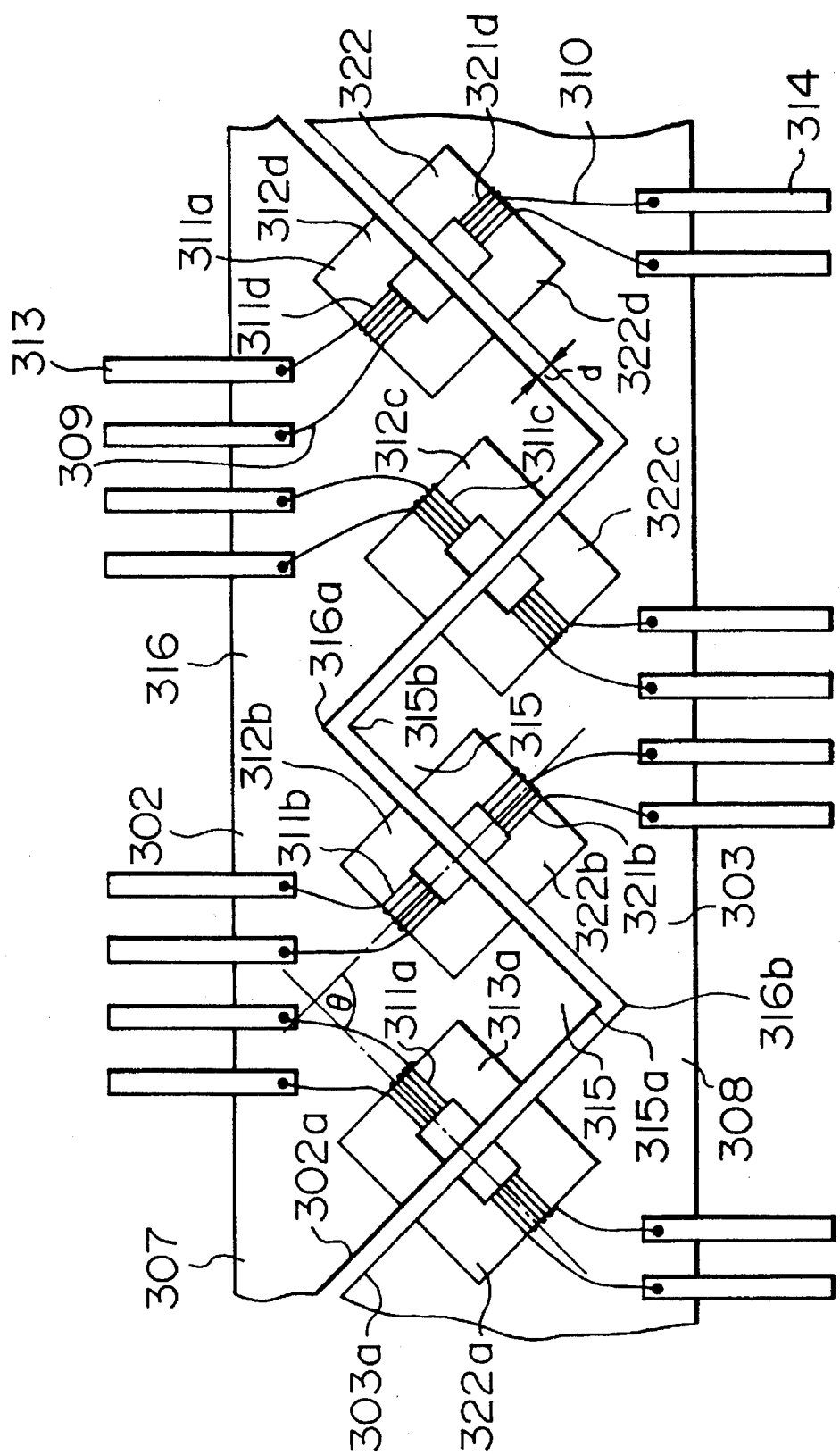
FIG. 14 is a plan view of principal portions of a connector portion according to the sixth embodiment of the present invention.

FIG. 14 explains the sixth embodiment of the present invention and is an enlarged view of the principal portions when each connector is connected to the IC memory card and to the recording/reproduction apparatus. In each of the connectors 302, 303 of the IC memory card and the recording/reproducing apparatus, a coil 311, 312 formed by winding a wire 311a, 311b such as a copper wire on a magnetic core 312, 322 is mounted to a substrate made of an insulating material such as a plastic material, the end face of each wire 312, 322 is connected to a terminal 313, 314, and transmission/reception of signals to and from a recording/reproducing circuit, etc., of the IC memory and the recording/reproducing apparatus can be made through the terminal 313, 314.

The end face 302a, 303a of each connector 302, 303 is shaped zigzag as shown in FIG. 14, the connector 302 of the IC memory card and the connector 303 of the recording/reproducing apparatus are machined on their end face in such a manner that convexities 315 mesh with concavities 316 as shown in FIG. 14, and a pair of coils 311, 321 are so disposed as to oppose each other between the apexes 315a, 315b, 316a, 316b of the convexities 315 and the concavities 316 and are operated to constitute an electromagnetic coupling type connector.

The coil in this embodiment is formed by winding a predetermined number of turns of the coil 311, 312 using a covered copper wire 309, 310 on an Mn-Zn ferrite core 312, 322 having a thickness of 2 mm, a length of 3 mm and a width of 2 mm. The angle (θ) between the fluxes occurring in the adjacent channels is set to 90°. Each coil 302, 303 has at least two coils 311, 321, and each coil functions as a channel for transmitting/receiving signals such as the data signal, a power supply signal, and so forth. Among fourteen channels in total, six channels (ch) are used for transferring the control signals and eight channels (ch) are used for data.

According to the construction described above, cross-talk between the adjacent channels can be reduced. Let's consider the coil 321c as the reception coil, by way of example.

The flux is tilted by 90° for the adjacent coils 311*d*, 311*b* for which the problem of cross-talk would otherwise occur, and cross-talk decreases in consequence. Further, a large number of coils can be disposed on one of the end faces of the connector, and mutual positioning of the connectors becomes easier. When the constituent connector components are so arranged as to oppose one another with gaps d of 0 to 0.5 mm and data transmission/reception is effected, a transfer rate of 1 (MB)/sec (s) can be obtained. Cross-talk between the adjacent channels is below −30 dB, and no problem occurs in data transfer.

Figure 15:
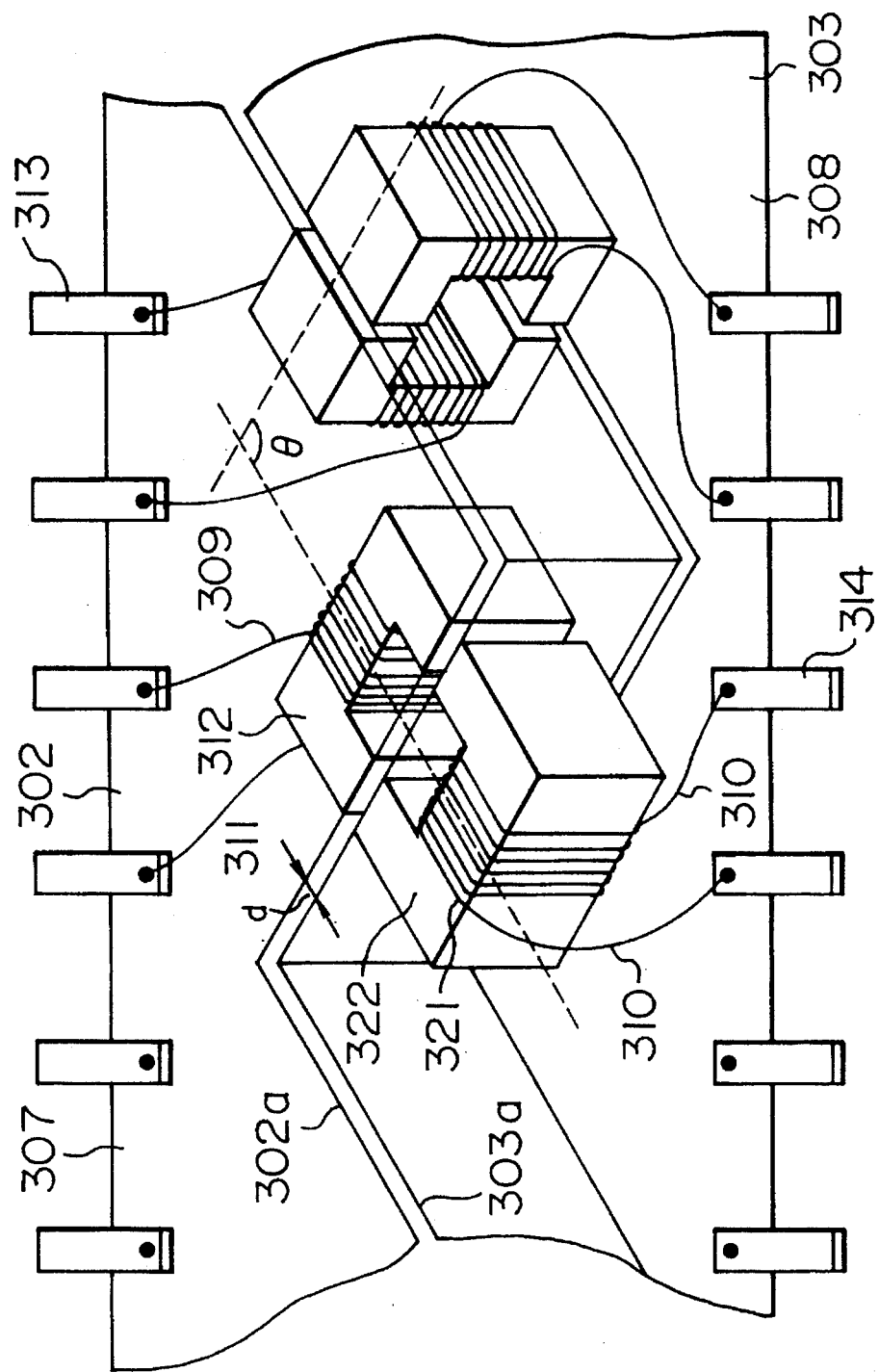
FIG. 15 is a perspective view of principal portions of a connector portion according to the seventh embodiment of the present invention.

FIG. 15 explains the seventh embodiment of the present invention and is an enlarged view of the principal portions of each connector. Constituent materials of each connector 302, 303 in this embodiment such as the substrate 307, 308, the coil 311, 321, the core 312, 322, etc., may be the same as those used in the sixth embodiment. In this embodiment, the coils 311, 321 are arranged in such a manner that the magnetic fluxes occurring between the adjacent channels constituted by a pair of coils 311, 321 opposing each other orthogonally cross each other. This arrangement can reduce cross-talk.

Figure 16:
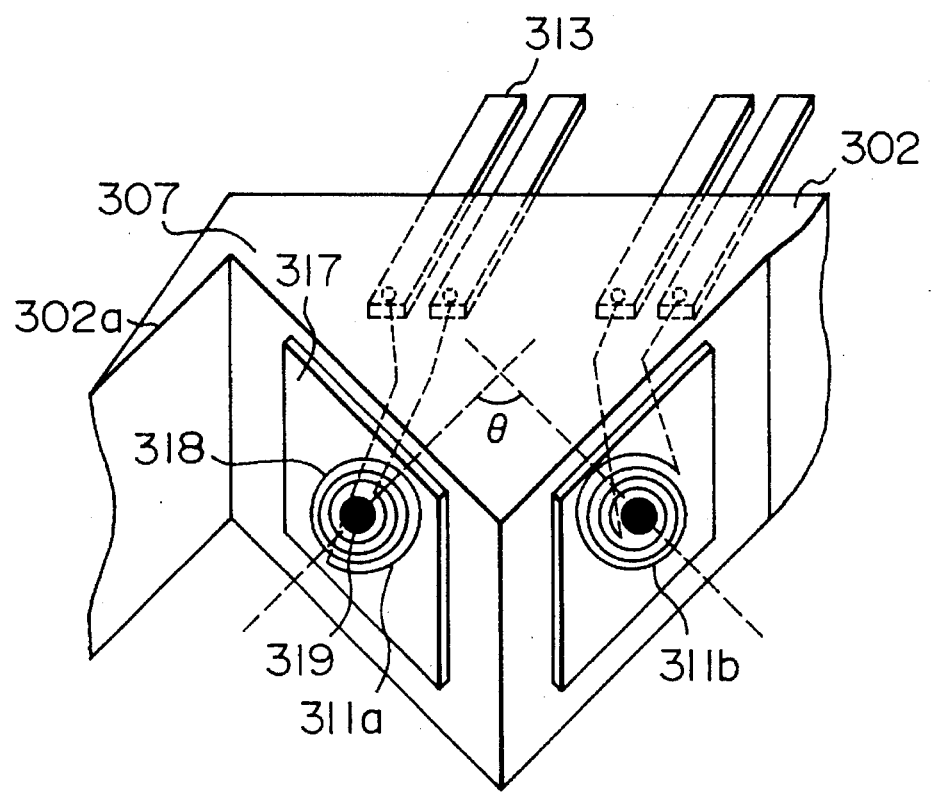
FIG. 16 is a perspective view of principal portions of a connector portion according to the eighth embodiment of the present invention.

FIG. 16 explains the eighth embodiment of the present invention, and is an enlarged view of the principal portions of one (302) of the connectors 302 and 303. The coils 311*a*, 311*b* of this connector 302 are formed as thin film coils by photolithography on an organic substrate 317 such as a polyimide resin on the connector substrate 307. A magnetic material having a high saturation flux density and a high permeability such as permalloy is formed as a core 319 inside this thin film coil 311.

Figure 17:
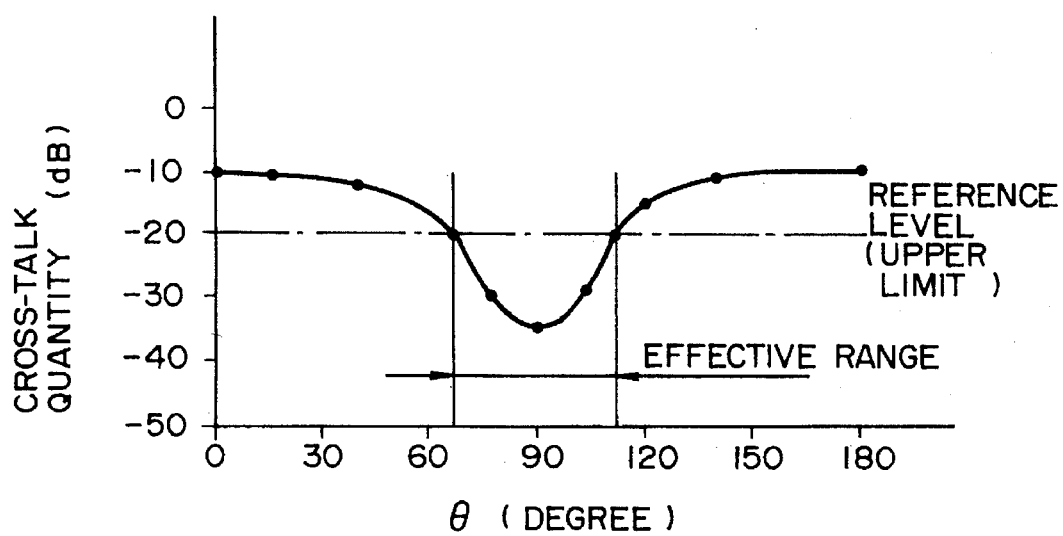
FIG. 17 is a diagram showing the relation between an angle of a magnetic flux and cross-talk occurring between adjacent channels.

In the sixth to eighth embodiments, the coils are disposed on the mountain-shaped slope. According to such adjacent coils, the fluxes cross one another in the adjacent coils depending on the angle of these fluxes. Accordingly, the influences of the angle ($\theta$) of the magnetic fluxes occurring in the adjacent channels on the cross-talk quantity is examined, and the result is shown in FIG. 17.

When $\theta$ is 0°, the fluxes occurring in the adjacent channels become parallel, and when the gap between the adjacent coils is small, the fluxes easily cross each other and the cross-talk quantity becomes maximum. As $\theta$ becomes greater, the mutually crossing fluxes decrease, so that cross-talk quantity decreases and becomes minimum at $\theta=90°$. When $\theta$ becomes further greater, the crossing fluxes again increase, so that the cross-talk quantity increases. Cross-talk allowed between the adjacent channels in signal transmission/reception is up to −20 dB and in such a case, the memory card can be normally operated. For the reasons described above, $\theta$ is preferably from 70° to 110°.

Figure 18:
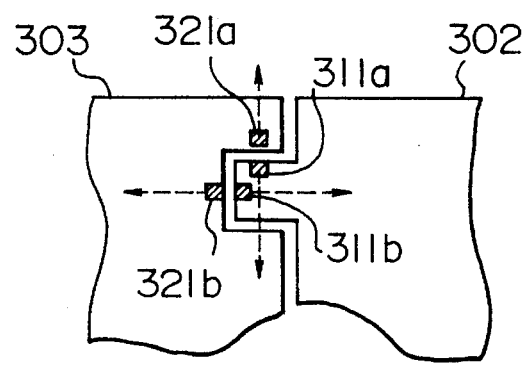
FIG. 18 is a schematic view showing the arrangement of a coil between an IC card and a reader/writer R/W.

FIG. 18 explains the ninth embodiment of the present invention. In the foregoing sixth to eighth embodiments, the end portion of the connector is shaped zigzag. In this embodiment, however, the connector end portion is shaped into concavoconvexities so that when two connectors are combined, they fit to each other. The coils 311, 321 are formed in the concavoconvexities. According to the construction described above, the coils to be packed can be packed in a higher density, and the advantages of the reduction of cross-talk and easy positioning can also be obtained.

FIGS. 19 to 25 show the tenth and eleventh embodiments of the present invention.

Figure 19:
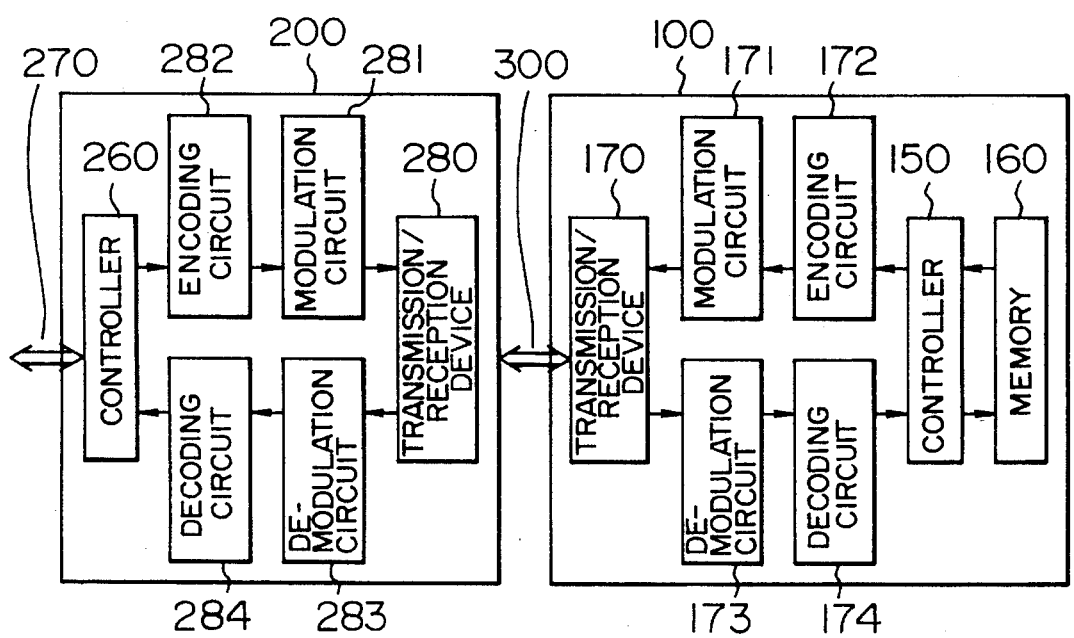
FIG. 19 is a block diagram showing, in simplified form, a data transmission/reception system.

FIG. 19 is a block diagram showing in a simplified form the flow of data of the IC card 100 and a reader/writer R/W 200, wherein encoding means and decoding means are added. In the drawing, the IC memory card 100 comprises transmission/reception means 170 equipped with transmission and reception coils, modulation means 171, demodulation means 173, encoding means 172 for transmitting signals in parallel as will be described elsewhere, decoding means 174, a controller 150 and a memory 160. On the other hand, R/W 200 comprises transmission/reception means 280 equipped with transmission and reception coils, modulation means 281, demodulation means 283, encoding means 282 for transmitting data in parallel as will be described later, decoding means 284 and a controller 260. Reference numeral 300 denotes a spatial signal transmission line between the data coils, and reference numeral 270 denotes a signal transmission line between R/W 200 and a host computer.

As can be seen from FIG. 19, the encoding/decoding means 172, 174, 282, 284 in both the IC card 100 and the R/W 200 are interposed between the controller 150, 260 and the demodulation means 171, 173, 281, 283, and data exchange is made between the IC card 100 and the R/W 200 as indicated by arrows.

Next, a concrete parallel data transmission system will be explained. The simplest method of eliminating simultaneous signal transmission between the adjacent channels is a distribution system referred to as "time division" or "serialization".

FIG. 20 is an explanatory view for explaining this distribution system. Signal transmission channels CH1 to CH4 are distributed in the form separated time-wise (the position or phase of pulse) for a clock CLK. FIG. 21 shows the structure of the encoding means 282, 172 for obtaining such pulses.

FIG. 21 shows a structural example using a delay device 502 providing a $\Delta t$ delay time. Three delay means are connected in series with pulsing means 501 for generating one pulse for one clock signal using the clock signal CLK. In this construction, one pulse generated by the pulsing means 501 has a delay time 0, is supplied as a pulse having a delay time $\Delta t$ through the delay device 502*a*, and is supplied as a pulse having the delay time $\Delta t$. The pulse passing through the delay device 502*b* turns to a pulse having the delay time $\Delta t$ and is supplied as a signal of CH3. The pulse passing through the delay device 502*c* turns to a pulse having the delay time $\Delta t$ and is supplies as a signal of CH4.

According to this method, simultaneous signal transmission is not effected between the adjacent channels, and the problems of signal interference and concentration of power consumption can be solved. However, signal detection resolution or in other words, margin for detection, drops by the number of division. Speaking reversely, signal transmission efficiency is low under the condition of the same detection margin.

The second method of solving simultaneous signal transmission is the method which transfers signals through encoding by an m-out-of-n system. The explanation will be given about the case of m=1 and n=4, for example. This method assumes that signal generation at a certain point of time among four channels is one. More concrete explanation will be given below. When the total number of channels in one parallel transmission system is four and a signal occurs in only one channel among them at a certain point of time (i.e. "1"), the total number of channels is n=4 and the number of the channels in which the signal occurs is m=1. This example will be further explained with reference to FIG. 22. Among the signal transmission channels CH1 to CH4, only one CH is "1" with the rest being all "0". In this case, therefore, the data expressed at one time by four CHs, that is, the data that can be transferred in parallel, is two bits. In this case, any of the four CHs detects "1". If the system is the one in which signal amplitude increases at "1", for example, it is only necessary to detect which CH among the four CHs has the greatest signal amplitude.

Accordingly, even when any interference exists between the adjacent channels, signal detection can be normally effected so long as the relation (real signal amplitude>interference signal amplitude) is satisfied (this condition can be ordinarily established).

Figure 23:
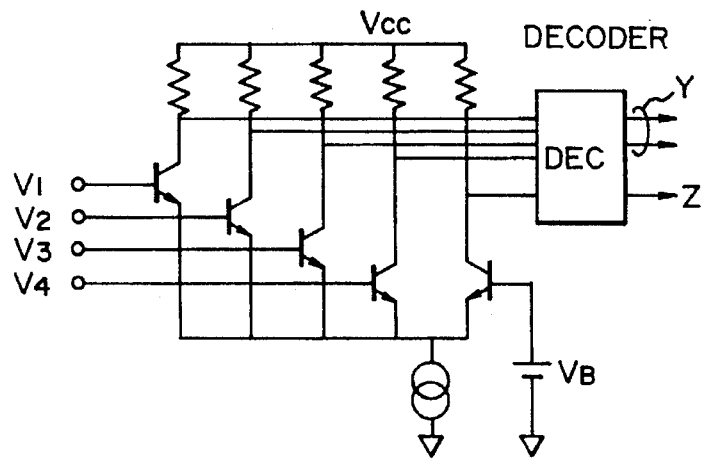
FIG. 23 is a definite circuit diagram for practising the eleventh embodiment.

FIG. 23 is a circuit diagram useful for explaining this system. The circuit comprises a maximum detection comparator which detects maximum power among the induced power $V_1$, $V_2$, $V_3$, $V_4$ of the coils of the four CHs and outputs 2-bit data Y. A current I flows through only a collector of a transistor in the CH having a relation Vi>Vb but does not flow through the others.

If Vi (i=1 to 4)<Vb, Z=1, and if Vi (i=1 to 4)>Vb, y=2-bit data. When the Z output is utilized, detection can be made by three inputs by deleting any one of $V_1$ to $V_4$.

The circuit can be similarly accomplished when encoding described above is duplexed. A definite example will be explained. It will be hereby assumed that eight channels CHs exist in all, the arrangement of CHs is CH1, 2, ..., 7, 8, and they are divided into the former half group (CH=1, 2, 3, 4) and the latter half group (CH=5, 6, 7, 8) from the aspect of the detection circuit. When each group is considered time-wise, only one CH is "1" and all the rest are "0". In other words, the circuit is set under the condition of m=1 and n=4.

Assuming that the signals occur in CH=4 of the former half CH group and in CH=6 of the latter half CH group, magnetic influences (cross-talk) occur in CH=5 between CH=4 and CH=6. However, the real signal amplitude is greater than the interference signal amplitude. Therefore, when CH having the greatest amplitude is judged in each group, they are found as CH=4 and CH=6, and CH=4 and CH=6 are judged as "1" with the others, inclusive of CH=5, as "0". In this way, correct detection can be made.

In this embodiment, the channels CHs are divided into the former half CH group and the latter half CH group. However, the channels may be divided into an odd-numbered CH group (CH=1, 3, 5, 7) and an even-numbered CH group (CH=2, 4, 6, 8). In this case, the signals are not simultaneously generated in the CHs on both sides or adjacent to the channel CH in which the signal is not generated. Accordingly, the worst case where both adjacent channels exert magnetic influences can be avoided, and the signal can be detected more correctly. Signal encoding on the basis of such a principle can be practised in diversified ways by various combinations of (m, n).

Besides encoding described above, there is a system which selects a combination, which does not set simultaneously both adjacent channels to "1" among the possible patterns having m=2 can be utilized.

Besides encoding by the m-out-of-n system, various encoding systems are also possible when n is great to a certain extent such as a system in which adjacent CHs do not become "1" simultaneously, a system which permits simultaneous "1" for only those CHs which are spaced apart by at least 2 CHs, and so forth.

Encoding described above considers only the spatial condition, but two-dimensional encoding simultaneously including time condition is effective. In other words, it is encoding which uses only the combinations of patterns capable of detecting and removing interference as the output pattern from all the possible patterns on a two-dimensional matrix constituted between the time of the individual CHs using the CHs as the space.

Figure 24:
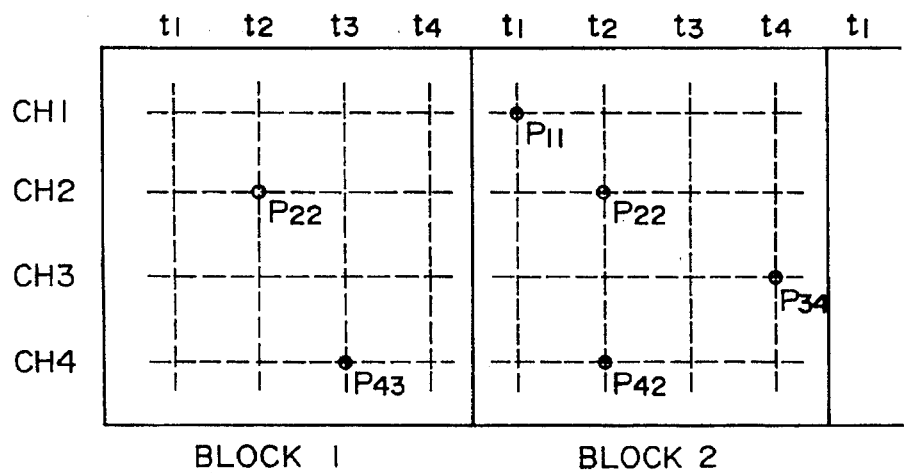
FIG. 24 is an explanatory view showing a block size of a transmission system according to the present invention.

This two-dimensional encoding will be explained with reference to FIG. 24. A 4×4 matrix constituted by the space of CH1 to CH4 and the time $t_1$ to $t_4$ is used as one block, and this encoding system uses, as the output pattern, only the sets of patterns satisfying a predetermined condition, from among all the possible patterns inside the block. In this case, the block size is predetermined block codes, but it may be variable block codes capable of changing the block size in accordance with the data.

The code of the block generated by the matrix of the space and the time is expressed as Pk={Pij} where Pk: code of block k

Pij: pulse at $t_j$ point for $CH_i$

The case shown in FIG. 24 can be expressed in the following way:

$$P_1 = \{P_{22}, P_{43}\}, P_2 = \{P_{11}, P_{22}, P_{42}, P_{34}\}$$
or
$$P_1 = \begin{pmatrix} 0000 \\ 0100 \\ 0000 \\ 0010 \end{pmatrix} \text{ or } P_2 = \begin{pmatrix} 1000 \\ 0100 \\ 0001 \\ 0000 \end{pmatrix}$$

In other words, the pattern of the pulse in the block k is expressed by the set of the patterns formed by the combinations of pulses Pij capable of removing the influences of interference. Accordingly, the number of the possible patterns described above is the code number of Pk.

In other words, in the case of $CH_1$ to $CH_4$ and $t_1$ to $t_4$ described above, the matrix size is 4×4, and the total number of the possible patterns is $2^{16}$ (16 bits). The code is constituted by only the set of the pattern which satisfy the non, interference condition.

Here, the non-interference condition, or the condition capable of detecting and removing interference between the pulses, means the following contents.

In the ordinary case where no condition is attached at all, a density is increased both time-wise and space-wise till the condition where interference takes place, under the condition where interference occurs between the pulses which are adjacent to one another time-wise and/or space-wise, by utilizing any of the following principles:

(1) to use only the sets of the patterns not causing interference (e.g. only the sets which are not adjacent to one another);

(2) to detect and remove the quantity of interference of the reception patterns (by compensation or correction);

(3) to estimate the quantity of interference for each pattern and to execute removal at the time of detection (compensation or correction);

(4) to estimate the quantity of interference for each pattern, and to incorporate in advance the interference component in the code itself;

(5) to estimate in advance all the patterns generated by interference and to use the patterns after interference for the code.

In the case of FIG. 7, for example, interference is removed by the detection method which detects the maximum point within the range within which the condition that the signal change quantity by interference is smaller than the original signal quantity is established. This is based on the principle (3) that the quantity of interference is estimated and countermeasure is taken at the time of detection.

The principle (4) corresponds to "pre-equalization" which has been known in the past in the field of communication.

Further, the principles (4) and (5) are equivalent to the application of partial response system, most likelihood system, etc., known in the field of magnetic recording, to the two-dimension of time and space.

Figure 25:
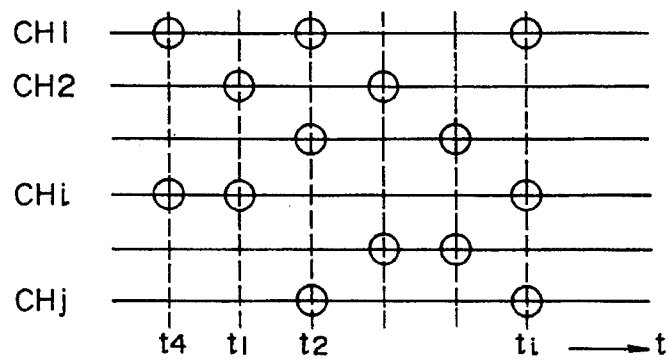
FIG. 25 is a diagram showing an example of generation of signals in the embodiments of the present invention.

FIG. 25 shows an example of two-dimensional encoding. As shown in the drawing, it employs the rule that signals do not simultaneously occur between the adjacent channels CHi and CHj. In other words, this example prevents the occurrence of interference between the channels which are spatially adjacent to one another.

Because this embodiment employs the construction as described above, interference does not occur between adjacent transmission lines in a plurality of parallelized signal transmission lines, so that high density transfer becomes possible.

Power consumption increases in data transfer in the parallel transfer lines at the time of signal transfer, but the construction of this embodiment can reduce it.

We claim:

1. An information recording card for exchanging data with external equipment by an electromagnetic coupling wherein a plurality of coils in the card, commensurate with a number of coils in the external equipment, are juxtaposed to make magnetic flux therefrom, respectively, cross orthogonally to a thickness of said information recording card so as to effect parallel data transfer with said external equipment.

2. An electromagnetic coupling connector for transferring data by an electromagnetic coupling system, comprising:

a plurality of data transfer coils, disposed at a side surface of an end portion of the connector, for transferring data via an electromagnetic coupling;

the side surface being substantially parallel to a thickness of the connector;

magnetic flux from the coils passing through, and substantially orthogonal to, the side surface; and transfer means for transferring a signal obtained from said plurality of data transfer coils to equipment to which said electromagnetic coupling connector is fitted.

3. The electromagnetic coupling connector of claim 2, said electromagnetic coupling connector further includes a signal transmission/reception portion and a power transmission or reception portion, said signal transmission/reception portion including a signal amplification circuit, a waveform shaping circuit, a serial/parallel signal conversion circuit and a parallel/serial signal conversion circuit, said power transmission portion including an oscillation circuit, and said power reception portion including a rectification smoothing circuit and a constant voltage circuit.

4. The electromagnetic coupling connector of claim 2, wherein the shape and outer dimension of said electromagnetic coupling connector are the same as the shape and outer dimension of a pin plug-in type connector.

5. The electromagnetic coupling connector of claim 2, wherein said plurality of data transfer coils are arranged such that directions of magnetic fluxes crossing said data transfer coils adjacent thereto are non-parallel.

6. The electromagnetic coupling connector of claim 2, wherein said plurality of data transfer coils are arranged such that directions of magnetic fluxes crossing said data transfer coils adjacent thereto are substantially orthogonal with one another.

7. The electromagnetic coupling connector of claim 2, wherein said plurality of data transfer coils includes three data transfer coils aligned such that a center axis of each of said coils is mutually parallel or coaxial, and directions of magnetic fluxes generated when a current is caused to flow through said coils of said plurality of data transfer coils change by 180° in every two coils.

8. The electromagnetic coupling connector of claim 2, wherein a winding direction of each of said coils is different in every two coils.

9. The electromagnetic coupling connector of claim 2, wherein the direction of the current flowing through each of said coils is different in every two coils.

10. The electromagnetic coupling connector of claim 2, wherein said plurality of data transfer coils are aligned such that a center axis of each of said coils is mutually parallel or coaxial, and wherein a cross-talk compensation circuit is disposed so as to cause a predetermined current to flow through a predetermined one of said coils so as to generate a magnetic flux to offset leakage fluxes occurring in the other of said coils.

11. The electromagnetic coupling connector of claim 2, wherein an end portion of a side surface of each of said data transfer coils has a zigzag shape, and said data transfer coils are disposed on the end between apexes and valleys of said zigzag end face.

12. The electromagnetic coupling connector of claim 11, wherein an angle θ of magnetic fluxes crossing said data transfer coils adjacent to one another is from 70° to 110°.

13. A portable data recording medium, comprising:

an IC memory, and an electromagnetic coupling connector connected electrically to said IC memory, said coupling connector including:

a plurality of data transfer coils for transferring data disposed at an end position of a side surface of said connector, waveform shaping means for shaping a waveform of a data signal received by said data transfer coils, and connection means for transferring a signal obtained by said waveform shaping means to equipment to which said electromagnetic connector is fitted, wherein data from Said equipment is recorded in said IC memory and signal data is sent from said IC memory to said equipment.

14. A data transfer system for transferring data electromagnetically between an information recording card and a data transfer terminal, the system comprising:

an information recording card, the card including a plurality of coils for inducing, and responding to, magnetic fields;

a data transfer terminal, the terminal including a plurality of coils for inducing, and responding to, magnetic fields, the coils of the terminal being commensurate in number to the coils of the card;

a surface of the information recording card being positioned against a surface of the data transfer terminal, when transferring data, such that the coils of the card are juxtaposed and aligned with the coils of the terminal, respectively;

information being transferred between the card and the terminal in parallel via induced magnetic fields;

the induced magnetic fields being substantially orthogonal to a thickness of the card.

15. A data transfer system according to claim 14, wherein said coils of said card or said terminal are subjected to transmission control in such a manner that said coils do not transmit signals when said coils adjacent thereto transmit signals, but transmit signals when said adjacent data transfer coils do not transmit signals.

16. A system as in claim 14, wherein:

the coils in the information recording card are all wound in the same direction, and the coils in the data transfer terminal are all wound in the same direction.

17. A system as in claim 14, wherein:

adjacent coils are wound so as to induce, and be responsive to, magnetic fields that are substantially orthogonal, thereby reducing crosstalk between adjacent coils.

18. A system as in claim 14, wherein:

a coil is wound around a core;

adjacent cores have the same orientation; and currents induced through adjacent coils flow in substantially opposite directions, thereby reducing crosstalk between adjacent coils.

19. A system as in claim 14, wherein each of the information recording card and the data transfer terminal further comprise:

a controller, operatively connected to the coils, for controlling transmission of data via selectively inducing magnetic fields in the coils; and zero compensation means, operatively connected to the controller and the coils, for inducing a compensation field in each coil that is intended to transmit a binary zero state and that is adjacent to a coil transmitting a binary one state, the induced compensation field being sufficient to cancel crosstalk from the adjacent coil inducing a field representing a binary one state, thereby enabling the compensated coil to represent a binary zero state by presenting a net zero field.

20. A system as in claim 14, wherein:

the surface of the information recording card that is positioned against the surface of the data transfer terminal is a sawtooth configuration; and the surface of the data transfer terminal against which is positioned the surface of the information recording card is a sawtooth configuration;

the sawtooth configuration of the information recording card and the sawtooth configuration of the data transfer terminal are complimentary such that they fit together; and a sawtooth configuration has peaks and valleys and faces therebetween, and at least one coil is positioned on a face.

21. A system as in claim 20, wherein:

the coils on adjacent faces are oriented such that the magnetic fields induced therefrom are orthogonal in two directions.

22. A system as in claim 20, wherein:

an angle $\theta$ of the sawtooth configuration, formed from an intersection between a first line normal to a face and a second line normal to an adjoining face, has a range: $70° \leq \theta \leq 110°$.

23. A system as in claim 22, wherein:

the angle 74 =90°.

24. A system as in claim 14, wherein:

the surface of the information recording card that is positioned against the surface of the data transfer terminal is a rectangular wave configuration; and the surface of the data transfer terminal against which is positioned the surface of the information recording card is a rectangular wave configuration;

the rectangular wave configuration of the information recording card and the rectangular wave configuration of the data transfer terminal are complimentary such that they fit together.

25. A system as in claim 14, wherein each of the information recording card and the data transfer terminal further comprise:

encoding means for encoding information transmitted via fields induced by the coils; and decoding means for decoding coded information received from fields to which the coils respond.

26. A system as in claim 25, wherein the encoding means further includes:comprising:

timing controller means for controlling a time at which a coil is energized such that fields of adjacent coils are induced at different times to reduce crosstalk therebetween.

27. A system as in claim 25, further comprising:

timing controller means for controlling a time at which a coil is energized such that fields of adjacent coils are induced at different times to reduce crosstalk therebetween.

28. An information recording card as in claim 1, wherein:

the coils in the information recording card are all wound in the same direction; and the coils in the external equipment are all wound in the same direction.

29. An information recording card as in claim 1, wherein:

adjacent coils are wound so as to induce, and be responsive to, magnetic fields that are substantially orthogonal, thereby reducing crosstalk between adjacent coils.

30. An information recording card as in claim 1, wherein:

a coil is wound around a core;

adjacent cores have the same orientation; and currents induced through adjacent coils flow in substantially opposite directions, thereby reducing crosstalk between adjacent coils.

31. An information recording card as in claim 1, wherein each of the information recording card and the external equipment further comprise:

a controller, operatively connected to the coils, for controlling transmission of data via selectively inducing magnetic fields in the coils; and zero compensation means, operatively connected to the controller and the coils, for inducing a compensation field in each coil that is intended to transmit a binary zero state and that is adjacent to a coil transmitting a binary one state, the induced compensation field being sufficient to cancel crosstalk from the adjacent coil inducing a field representing a binary one state, thereby enabling the compensated coil to represent a binary zero state by presenting a net zero field.

* * * * *